US010972500B2

(12) United States Patent
Zhong et al.

(10) Patent No.: US 10,972,500 B2
(45) Date of Patent: Apr. 6, 2021

(54) DETECTION SYSTEM, DETECTION APPARATUS, DETECTION METHOD, AND DETECTION PROGRAM

(71) Applicant: NIPPON TELEGRAPH AND TELEPHONE CORPORATION, Chiyoda-ku (JP)

(72) Inventors: Yang Zhong, Musashino (JP); Hiroshi Asakura, Musashino (JP); Yoshihito Oshima, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 196 days.

(21) Appl. No.: 15/578,908

(22) PCT Filed: Jun. 3, 2016

(86) PCT No.: PCT/JP2016/066642
§ 371 (c)(1),
(2) Date: Dec. 1, 2017

(87) PCT Pub. No.: WO2016/195090
PCT Pub. Date: Dec. 8, 2016

(65) Prior Publication Data
US 2018/0176250 A1     Jun. 21, 2018

(30) Foreign Application Priority Data
Jun. 5, 2015   (JP) .............................. JP2015-115034

(51) Int. Cl.
*H04L 29/06* (2006.01)
*G06F 21/31* (2013.01)
(Continued)

(52) U.S. Cl.
CPC .......... *H04L 63/1466* (2013.01); *G06F 21/31* (2013.01); *G06F 21/552* (2013.01);
(Continued)

(58) Field of Classification Search
CPC ............... H04L 63/1466; H04L 63/104; H04L 63/1416; H04L 63/08; H04L 63/1425;
(Continued)

(56) References Cited

U.S. PATENT DOCUMENTS 7,508,757 B2 *   3/2009  Ge .......................  H04L 12/462
                                                        370/229
7,624,447 B1 *  11/2009  Horowitz ............  H04L 63/0263
                                                        726/23
(Continued)

FOREIGN PATENT DOCUMENTS

JP     2005-341217 A     12/2005
JP     2011-150612 A      8/2011
WO       03/100619 A1    12/2003

OTHER PUBLICATIONS

International Search Report dated Aug. 30, 2016 in PCT/JP2016/066642 filed Jun. 3, 2016.
(Continued)

*Primary Examiner* — Carl G Colin
*Assistant Examiner* — Hany S. Gadalla
(74) *Attorney, Agent, or Firm* — Oblon, McClelland, Maier & Neustadt, L.L.P.

(57) ABSTRACT

A detection apparatus extracts an account and a source address of the account from authentication information obtained from an authentication apparatus configured to perform user authentication, groups accounts for each of time slots at predetermined time intervals and each of source addresses in accordance with a timestamp and the source address of the account, and extracts an account group from
(Continued)

which duplication of an identical account in an identical group has been excluded. Subsequently, the detection apparatus calculates the number of duplicate accounts among the extracted account groups. The detection apparatus determines that an identical source address is an address of an attacker in a case where the number of account groups of the identical source address in which the number of calculated accounts exceeds a first threshold exceeds a second threshold.

8 Claims, 6 Drawing Sheets

(51) Int. Cl.
  *G06F 21/55* (2013.01)
  *H04L 12/26* (2006.01)
(52) U.S. Cl.
  CPC ............ *H04L 63/08* (2013.01); *H04L 63/104* (2013.01); *H04L 63/1416* (2013.01); *H04L 63/1425* (2013.01); *G06F 2221/2135* (2013.01); *H04L 43/106* (2013.01)
(58) Field of Classification Search
  CPC ..... H04L 43/106; G06F 21/552; G06F 21/31; G06F 2221/2135
  See application file for complete search history.

(56) References Cited

U.S. PATENT DOCUMENTS

| | | | | |
|---|---|---|---|---|
| 7,706,263 | B2* | 4/2010 | Zhou | H04L 51/12 370/230 |
| 8,234,503 | B2* | 7/2012 | Gassoway | G06F 21/552 713/188 |
| 8,832,832 | B1* | 9/2014 | Visbal | H04L 63/1441 726/22 |
| 8,984,627 | B2* | 3/2015 | Ormazabal | H04L 63/1458 726/12 |
| 2005/0086538 | A1 | 4/2005 | Kubota | |
| 2005/0216955 | A1 | 9/2005 | Wilkins et al. | |
| 2005/0289649 | A1 | 12/2005 | Mitomo et al. | |
| 2006/0159028 | A1* | 7/2006 | Curran-Gray | H04L 43/026 370/252 |
| 2006/0256729 | A1* | 11/2006 | Chen | H04L 63/1408 370/250 |
| 2007/0220605 | A1 | 9/2007 | Chien | |
| 2009/0064329 | A1* | 3/2009 | Okumura | H04L 51/12 726/22 |
| 2009/0198707 | A1* | 8/2009 | Rohner | H04L 63/1408 |
| 2009/0300759 | A1* | 12/2009 | Wang | H04L 63/101 726/22 |
| 2011/0035795 | A1* | 2/2011 | Shi | H04L 43/026 726/13 |
| 2011/0185419 | A1 | 7/2011 | Boteler et al. | |
| 2012/0084860 | A1* | 4/2012 | Cao | H04L 63/1441 726/23 |
| 2015/0106198 | A1* | 4/2015 | Miller | G06Q 30/0255 705/14.52 |
| 2015/0213358 | A1* | 7/2015 | Shelton | H04L 41/0604 706/47 |
| 2016/0261616 | A1* | 9/2016 | Shulman | H04L 63/1416 |
| 2017/0098067 | A1* | 4/2017 | Paluri | G06F 21/31 |
| 2018/0007088 | A1* | 1/2018 | Kuznetsov | G06F 21/55 |

OTHER PUBLICATIONS

"Countermeasures against Unauthorized Logins Caused by List-type Account Hacking (Collection of Countermeasures for Internet Service Operators, including Site Administrators)", Ministry of Internal Affairs and Communications, Dec. 2013, 26 total pages (with English translation of relevant part).

* cited by examiner

DETECTION SYSTEM, DETECTION APPARATUS, DETECTION METHOD, AND DETECTION PROGRAM

FIELD

The present invention relates to a detection system, a detection apparatus, a detection method, and a detection program.

BACKGROUND

In many services on the Internet, account authentication is used to confirm identity. For example, a user attempts account authentication to use a service, and can use the service by logging into the service solely in a case where the authentication is successful. Generally, account authentication uses an account and a password. In recent years, there are incidences of a damage of an unauthorized login using an account and a password accidentally authenticated by account hacking of performing repeated attempts of account authentication using a large number of accounts and passwords.

To cope with this, in order to prevent the damage by the account hacking, there is a method of counting the number of account authentications and authentication failures within a fixed period of time and detecting the case as account hacking in a case where the number of authentication failures exceeds a fixed number. Even with normal use, an authentication failure does occur at a certain rate due to a forgotten password, or the like. In a case where a plurality of users shares an identical Internet protocol (IP) address or an identical channel, such as within a company or a wireless local area network (LAN) spot, the number of authentication failures from an identical address or an identical channel is increased, leading to a case where the number of authentication failures within a fixed period of time exceeds the fixed number. Even the case like this case might be erroneously detected as account hacking. Therefore, in practice, it is common to use a ratio of the number of authentication failures and the number of authentication successes within a fixed period of time to the number of authentication attempts, namely, an authentication failure rate and an authentication success rate.

CITATION LIST

Non-Patent Literature

Non-patent Literature 1: "Countermeasures against Unauthorized Logins Caused by List-type Account Hacking (Collection of Countermeasures for Internet Service Operators, including Site Administrators)", Ministry of Internal Affairs and Communications, December 2013

SUMMARY

Technical Problem

In a case, however, where detection of account hacking is performed using the authentication failure rate and the authentication success rate, an attacker prepares a dummy account to perform a large number of unauthorized logins without lowering the authentication failure rate and the authentication success rate.

Specifically, the attacker prepares both a dummy account that can be successfully logged in and an account (target account) as a target of an unauthorized login, and attempts to log in on the basis of a list including a mixture of the dummy account and the target account. Subsequently, the attacker repeats login attempt while changing the target account itself or the password for the target account. This conventional detection method of setting a threshold for each of the authentication failure rate and the authentication success rate would not decrease the authentication failure rate and the authentication success rate, making it difficult to detect such account hacking by the threshold.

An exemplary embodiment disclosed by the present application has been made in view of the above-described issue, and is intended to enhance the account hacking detection accuracy.

Solution to Problem

An exemplary embodiment disclosed in the application concerned extracts an account and a source address of the account from authentication information obtained from an authentication apparatus configured to perform user authentication, groups accounts for each of time slots at predetermined time intervals and each of source addresses in accordance with a timestamp and the source address of the account. The exemplary embodiment extracts an account group from which duplication of an identical account in an identical group has been excluded. The exemplary embodiment calculates the number of duplicate accounts among the extracted account groups. The exemplary embodiment determines that an identical source address is an address of an attacker in a case where the number of account groups of the identical source address in which the number of calculated accounts exceeds a first threshold exceeds a second threshold.

Advantageous Effects of Invention

According to an exemplary embodiment disclosed by the present application, it is possible to enhance the account hacking detection accuracy, for example.

DESCRIPTION OF EMBODIMENTS

Embodiment

Hereinafter, embodiments of a detection system, a detection apparatus, a detection method, and a detection program disclosed by the present application will be described. Note that the following embodiments are merely exemplary embodiments, and do not limit the technique disclosed by the present application. In addition, various modes and Examples described below may be appropriately combined within a scope that does not cause any contradiction.

Exemplary System According to Embodiment

Figure 1:
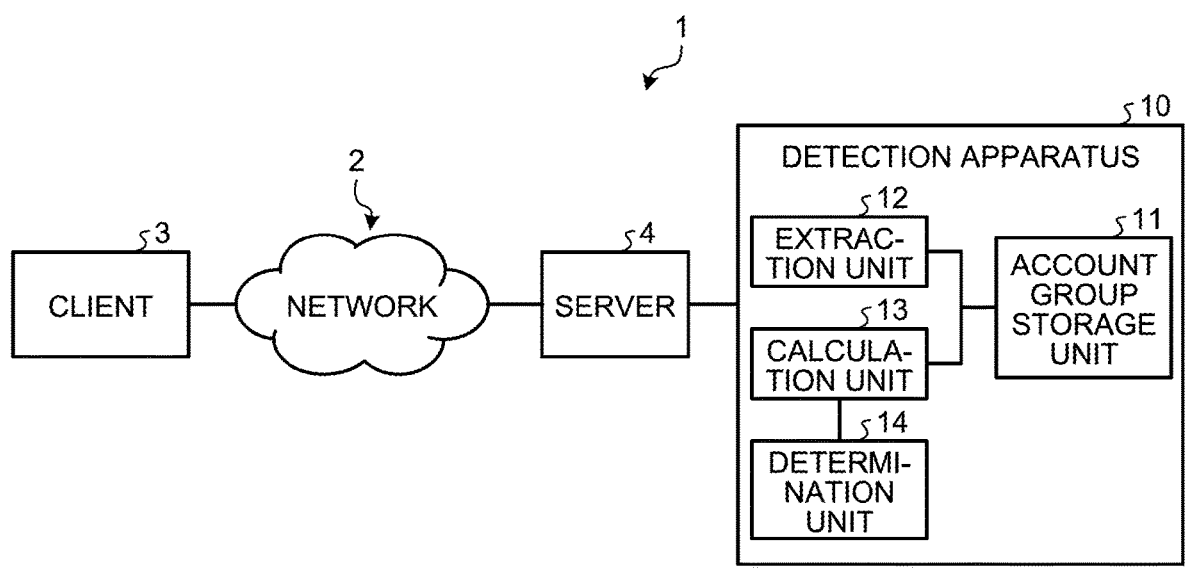
FIG. 1 is a block diagram illustrating an exemplary system according to an embodiment.

FIG. 1 is a block diagram illustrating an exemplary system according to an embodiment. A system 1 according to the embodiment includes a client 3 and a server 4 connected with each other via a network 2 such as a public network. A detection apparatus 10 is connected to the server 4. A user issues an authentication request to the server 4 via the network 2, and the server 4 returns a result to the user. At this time, the server 4 holds authentication user information and an authentication result as an authentication record, and transmits them to the detection apparatus 10.

The client 3 is a terminal of the user who uses a service via the network 2. In the embodiment, the client 3 also includes a terminal of the attacker that performs account hacking. The server 4 is a server that performs user authentication using an account in an application server that provides a service. The server 4 authenticates the user by using user information such as a user account and a password received from the client 3.

Subsequently, the server 4 outputs an authentication record. The authentication record includes, for example, a user account (hereinafter referred to as an account), a password, a timestamp, an IP address of the client 3 as a source of the account and the password. The authentication record may be output in a log format. The server 4 may be configured integrally with the application server that provides the service in hardware or in software. Moreover, the server 4 may be configured integrally with a detection apparatus 10 to be described below in hardware or in software.

The detection apparatus 10 detects an attack of account hacking to the server 4. The detection apparatus 10 includes an account group storage unit 11, an extraction unit 12, a calculation unit 13, and a determination unit 14.

The extraction unit 12 extracts an account for each authentication, a timestamp, and an IP address of the client 3 as an account source (hereinafter referred to as a source IP address) from the authentication record received from the server 4. Note that a media access control (MAC) address, or the like, may be used as well as the source IP address as long as it is a network identifier that can specify the client 3 as the account source. The timestamp extracted by the extraction unit 12 from the authentication record received from the server 4 is a time point at which the user attempts authentication on the server 4 using the account. Alternatively, the timestamp may be the time point at which the authentication record reaches the detection apparatus 10 from the server 4 or may be the time point at which the account is extracted from the authentication record on the detection apparatus 10.

Subsequently, the extraction unit 12 groups extracted accounts for each of time slots of a period $\Delta$ and each of source IP addresses in accordance with the timestamp and the source IP address of the account. Subsequently, the extraction unit 12 excludes duplication of an identical account within an identical group of accounts that are grouped. Extraction of the account group performed by the extraction unit 12 is as described above. Subsequently, the extraction unit 12 stores the extracted account group in the account group storage unit 11.

Figure 2:
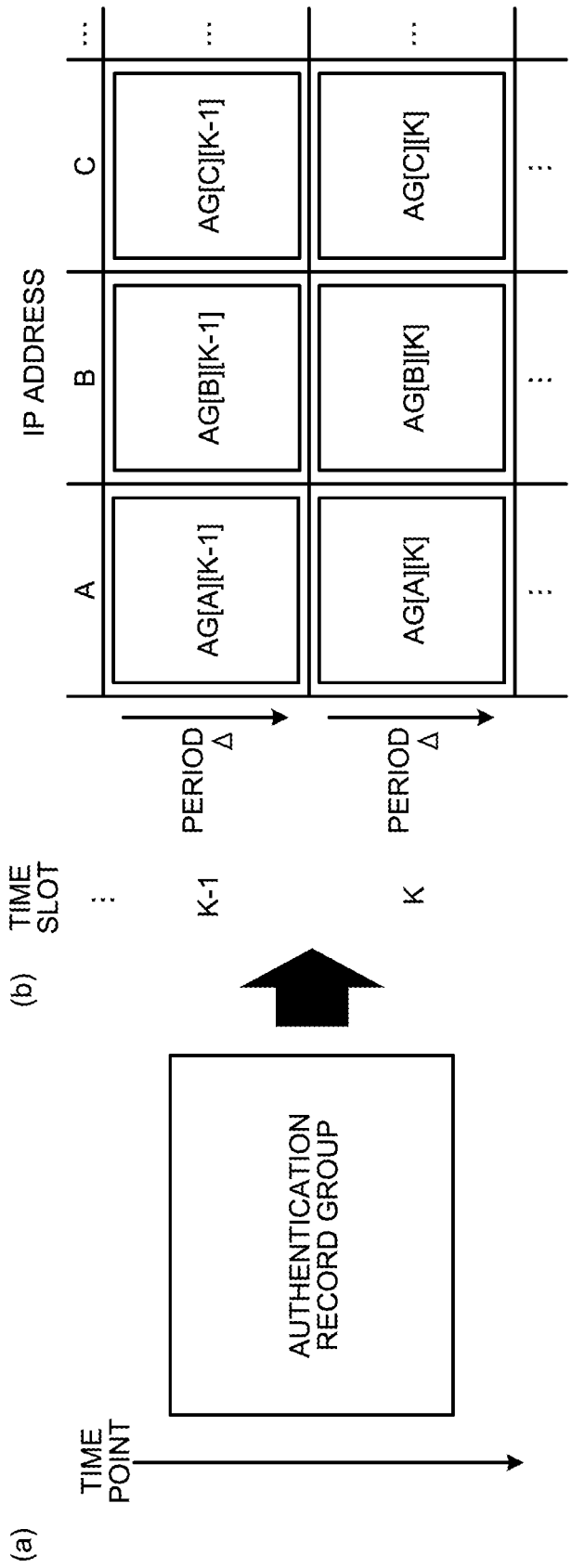
FIG. 2 is a diagram illustrating an exemplary account group according to the embodiment.

FIG. 2 is a diagram illustrating an exemplary account group according to the embodiment. (a) of FIG. 2 schematically illustrates a plurality of accounts having different time points of timestamps and source IP addresses as an authentication record group. As illustrated in (b) of FIG. 2, the extraction unit 12 of the detection apparatus 10 forms authentication record groups by grouping the accounts for each of predetermined periods $\Delta$ (time slots K and K−1) to which the timestamp belongs and for each of the source IP addresses (IP addresses A, B, and C). Subsequently, the extraction unit 12 excludes account duplication in an identical account group.

For example, in a case where timestamp=t1 is included in time slot K−1 and the source IP address=A, account=aaa is included in account group AG[A][K−1] illustrated in (b) of FIG. 2. Note that time slot K is a period immediately following time slot K−1. Note that (b) of FIG. 2 illustrates merely an example, and the number of time slots and the number of source IP addresses are not limited to those illustrated in (b) of FIG. 2.

The calculation unit 13 reads the account groups extracted by the extraction unit 12 and stored in the account group storage unit 11, and calculates the number of duplicate accounts among each of the account groups (hereinafter referred to as the number of duplicate accounts). For example, in a case where there are two account groups {aaa, bbb, ccc} and {bbb, ccc} extracted by the extraction unit 12, the calculation unit 13 calculates the number of duplicate accounts=2 because accounts bbb and ccc are duplicate between the two account groups. A calculation example by the calculation unit 13 will be described below on the basis of Examples 1 to 5.

On the basis of a calculation result of the calculation unit 13, in a case of the number of account groups>$\beta$ (second threshold) ($\beta$ is a predetermined positive number) in which the number of duplicate accounts>$\alpha$ (first threshold) ($\alpha$ is a predetermined positive number) the determination unit 14 determines in units of source IP addresses that the source IP address is the IP address of the client 3 as the attacker involved in account hacking. A processing example by the determination unit 14 will be described below on the basis of Examples 1 to 5.

Detection Processing According to Embodiment

Figure 3:
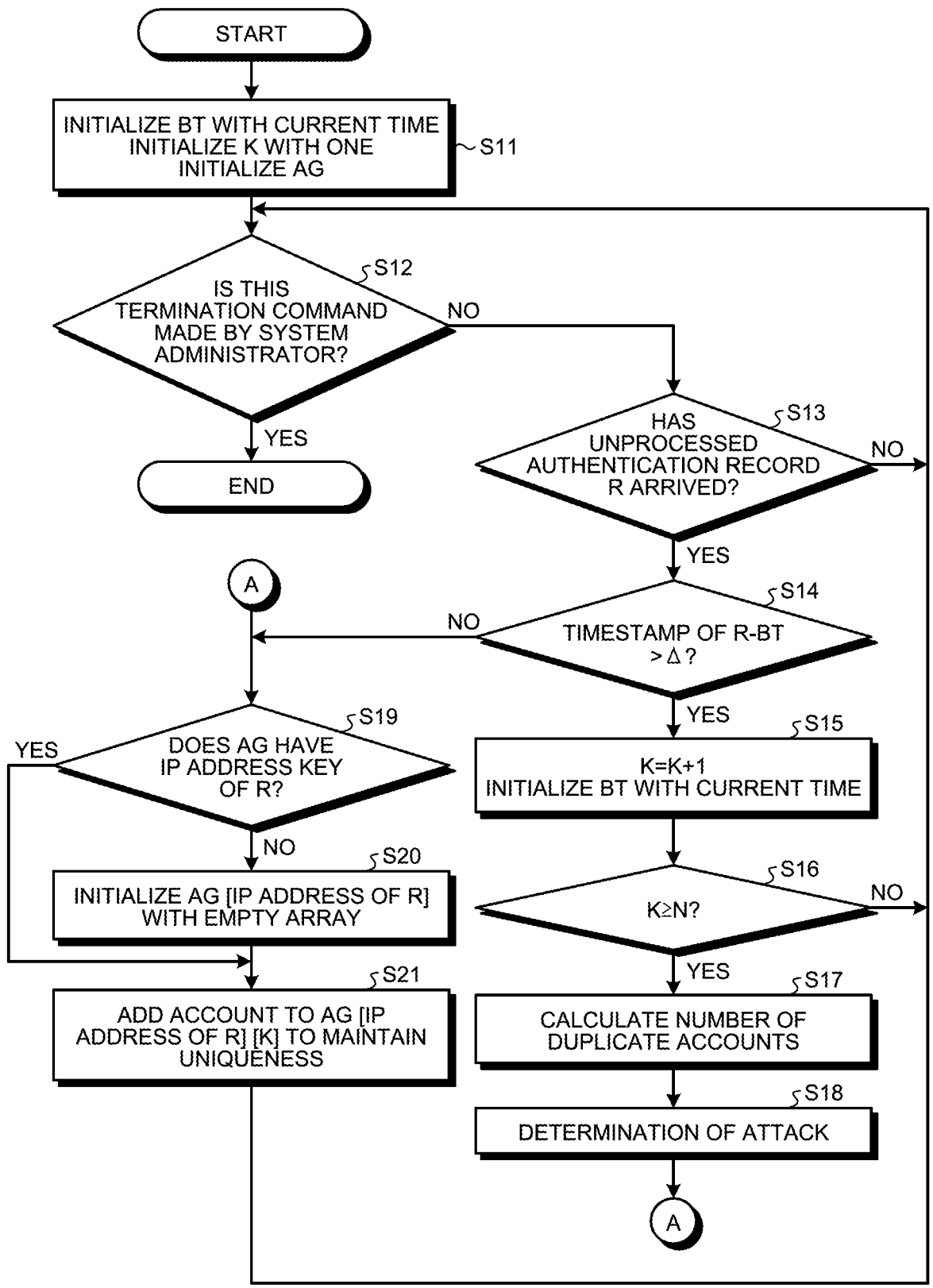
FIG. 3 is a flowchart illustrating exemplary detection processing according to the embodiment.

FIG. 3 is a flowchart illustrating exemplary detection processing according to the embodiment. The detection processing according to the embodiment is executed by the detection apparatus 10. First, the detection apparatus 10 initializes a reference timestamp BT of the time slot with the current time. Subsequently, the detection apparatus 10 initializes a time slot ID_K with one. Subsequently, the detection apparatus 10 initializes an array AG storing the account group (procedure hereinabove is Step S11).

Next, the detection apparatus 10 determines whether a termination command by a system administrator has been input into the system 1 from a console (not illustrated) (Step S12). In a case where the detection apparatus 10 determines that the termination command has been input by the system administrator (Step S12: Yes), the detection apparatus 10 terminates the detection processing. In contrast, in a case where the detection apparatus 10 determines that the termination command by the system administrator has not been input (Step S12: No), the detection apparatus 10 moves the processing to Step S13.

In Step S13, the detection apparatus 10 determines whether an unprocessed authentication record R has arrived. In a case where the detection apparatus 10 determines that the unprocessed authentication record R has arrived (Step S13: Yes), the detection apparatus 10 moves the processing to Step S14. In contrast, in a case where the detection apparatus 10 determines that the unprocessed authentication record R has not arrived (Step S13: No), the detection apparatus 10 moves the processing to Step S12.

In Step S14, the detection apparatus 10 determines whether a result obtained by subtracting the reference timestamp BT of the time slot from the timestamp of the unprocessed authentication record R determined to have arrived in Step S13 is greater than the predetermined period Δ. That is, the detection apparatus 10 determines in Step S14 whether the timestamp of the unprocessed authentication record R determined to have arrived in Step S13 is within a time period of the reference timestamp BT of the time slot initialized in Step S11 or Step S15 (described below) with the current time+predetermined period Δ.

In a case where the detection apparatus 10 determines that the result obtained by subtracting the reference timestamp BT of the time slot from the timestamp of the unprocessed authentication record R determined to have arrived in Step S13 is greater than the predetermined period Δ (Step S14: Yes), the detection apparatus 10 moves the processing to Step S15. In contrast, in a case where the detection apparatus 10 determines that the result obtained by subtracting the reference timestamp BT of the time slot from the timestamp of the unprocessed authentication record R determined to have arrived in Step S13 is the predetermined period Δ or less (Step S14: No), the detection apparatus 10 moves the processing to Step S19.

In Step S15, the detection apparatus 10 increments the time slot ID_K by one and initializes the reference timestamp BT of the time slot with the current time. Next, the detection apparatus 10 determines whether time slot ID_K≥N is satisfied (Step S16). Herein, N is a predetermined natural number indicating the number of the time slots as a target of calculation of the number of duplicate accounts. In a case where the detection apparatus 10 determines that time slot ID_K≥N is satisfied (Step S16: Yes), the detection apparatus 10 moves the processing to Step S17. In contrast, in a case where the detection apparatus 10 determines that time slot ID_K<N is satisfied (Step S16: No), the detection apparatus 10 moves the processing to Step S12.

In Step S17, the detection apparatus 10 calculates the number of duplicate accounts. Details of the calculation of the number of duplicate accounts will be described below on the basis of Examples 1 to 5. Next, the detection apparatus 10 determines the IP address of the client 3 as the attacker involved in account hacking from the calculation result of the number of duplicate accounts in Step S17 (Step S18; attack determination). Details of attack determination will be described below on the basis of Examples 1 to 5. Upon completion of Step S18, the detection apparatus 10 moves the processing to Step S19.

In contrast, the detection apparatus 10 determines in Step S19 whether the array AG has a key of the IP address of the unprocessed authentication record R determined to have arrived in Step S13. In a case where the detection apparatus 10 determines that the array AG has the key of the IP address of the unprocessed authentication record R determined to have arrived in Step S13 (Step S19: Yes), the detection apparatus 10 moves the processing to Step S21. In contrast, in a case where the detection apparatus 10 determines that the array AG does not have the key of the IP address of the unprocessed authentication record R determined to have arrived in Step S13 (Step S19: No), the detection apparatus 10 moves the processing to Step S20.

In Step S20, the detection apparatus 10 initializes array AG[IP address of authentication record R] with an empty array. Note that array AG[source IP address][K] is an array for storing an account belonging to an account group defined by the source IP address and the time slot ID_K.

Subsequently, in Step S21, the detection apparatus 10 adds an account to array AG[IP address of authentication record R][K] so as to maintain uniqueness. That is, the detection apparatus 10 adds, in Step S21, solely the account that has not been stored to array AG[the IP address of the authentication record R][K] without storing the already stored account. Otherwise, in Step S21, the detection apparatus 10 adds an account to array AG[IP address of authentication record R][K] while excluding duplication. Upon completion of Step S21, the detection apparatus 10 moves the processing to Step S12.

Effects of Embodiment

In the embodiment, by focusing on a fact that the dummy account prepared by the attacker is finite and thus, the dummy account is repeatedly used, detection of an attack is performed on the basis of the number of duplicate accounts used in login attempts from each of the source IP addresses during a fixed period. Accordingly, with the embodiment, it is possible to detect the attack even in a case where the attacker performs account hacking using a list in which dummy accounts are mixed with the target account.

Example 1

Figure 4:
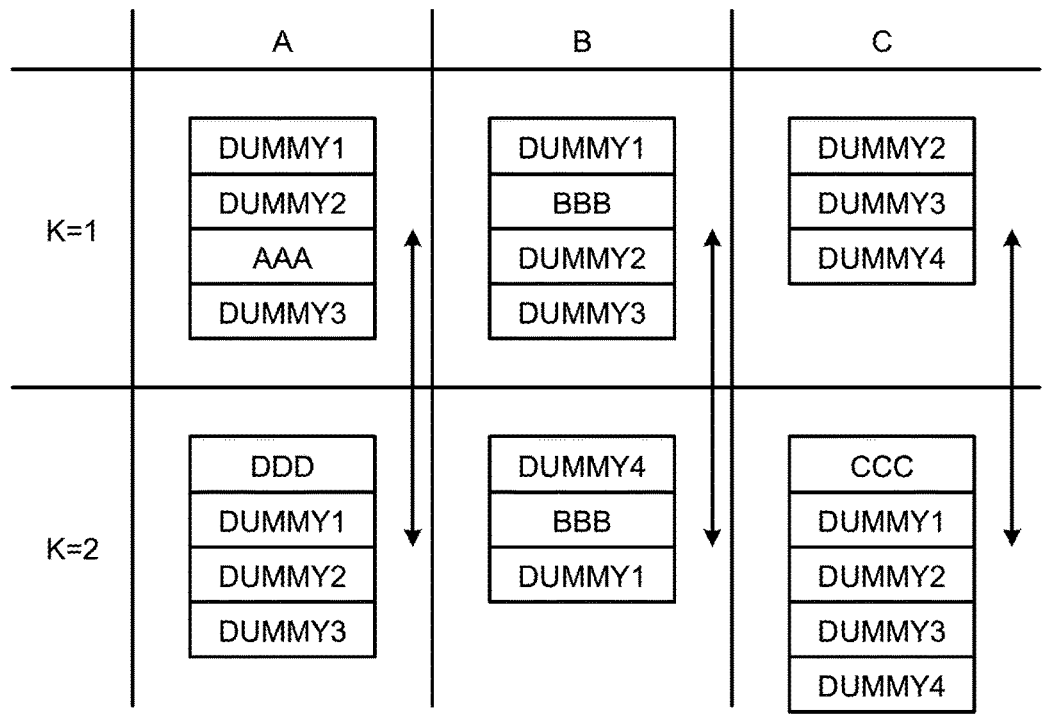
FIG. 4 is a diagram illustrating an example of an outline of detection processing according to Example 1.

FIG. 4 is a diagram illustrating an example of an outline of detection processing according to Example 1. In Example 1, the number of duplicate accounts $H[X][X][K][Ki]$ of $AG[X][K]$ and $AG[X][Ki]$ with respect to a certain source IP address X included in the time slot ID_K is calculated by the following Formula (1). Herein, Ki is a certain time slot $ID(K-N+1 \leq Ki \leq K(N>0))$. Note that |*| indicates the number of elements of a set *. In Example 1, the calculation unit 13 calculates the number of duplicate accounts using $H[X][X][K][Ki]$ according to the following Formula (1).

$$H[X][X][K][Ki] = |AG[X][K] \cap AG[X][Ki]| \qquad (1)$$

where $K-N+1 \leq Ki \leq K(N>0)$

Moreover, in Example 1, the determination unit 14 calculates C[X] defined by the following Formula (2) in relation with a function $TH(H[X][X][K][Ki])$ that results in one when $H[X][X][K][Ki] > \alpha$, and results in zero when $H[X][X][K][Ki] \leq \alpha$, with respect a predetermined positive number α. Subsequently, the determination unit 14 determines that the source IP address X that satisfies $C[X] > \beta$ with respect to a predetermined positive number β is the IP address of the client 3 as the attacker by the following Formula (3). The determination unit 14 determines that the source IP address X that satisfies $C[X] \leq \beta$ with respect to the predetermined positive number β is not the IP address of the client 3 as the attacker.

$$C[X] = \sum_{K-N+1 \leq Ki \leq K} TH(H[X][X][K][Ki]) \text{ where} \qquad (2)$$

-continued $$TH(H[X][X][K][Ki]) = \begin{cases} 1(H[X][X][K][Ki] > \alpha) \\ 0(H[X][X][K][Ki] \leq \alpha) \end{cases}$$

$C[X] > \beta \Rightarrow \text{IP address } X \text{ is the IP address of attacker}$ (3)

For example, as illustrated in FIG. 4, it is assumed that an account group AG exists. FIG. 4 illustrates an exemplary case where K=2 and N=2. The calculation unit 13 calculates the number of duplicate accounts as follows. That is, each of "DDD", "DUMMY 1", "DUMMY 2", and "DUMMY 3" is a duplicate account between AG[A][2] and AG[A][2], and thus, the result is H[A][A][2][2]=4. In another case, each of "DUMMY 1", "DUMMY 2", and "DUMMY 3" is a duplicate account between AG[A][2] and AG[A][1], and thus, the result is H[A][A][2][1]=3. Therefore, when α=2, the result is C[A]=2. Similarly, the results are C[B]=1 and C[C]=2.

Subsequently, when β=2, the source IP address X that satisfies C[X]>2 does not exist, and thus, the determination unit 14 determines none of the source IP addresses is the IP address of the client 3 as the attacker by the above-described Formula (3).

Example 2

Figure 5:
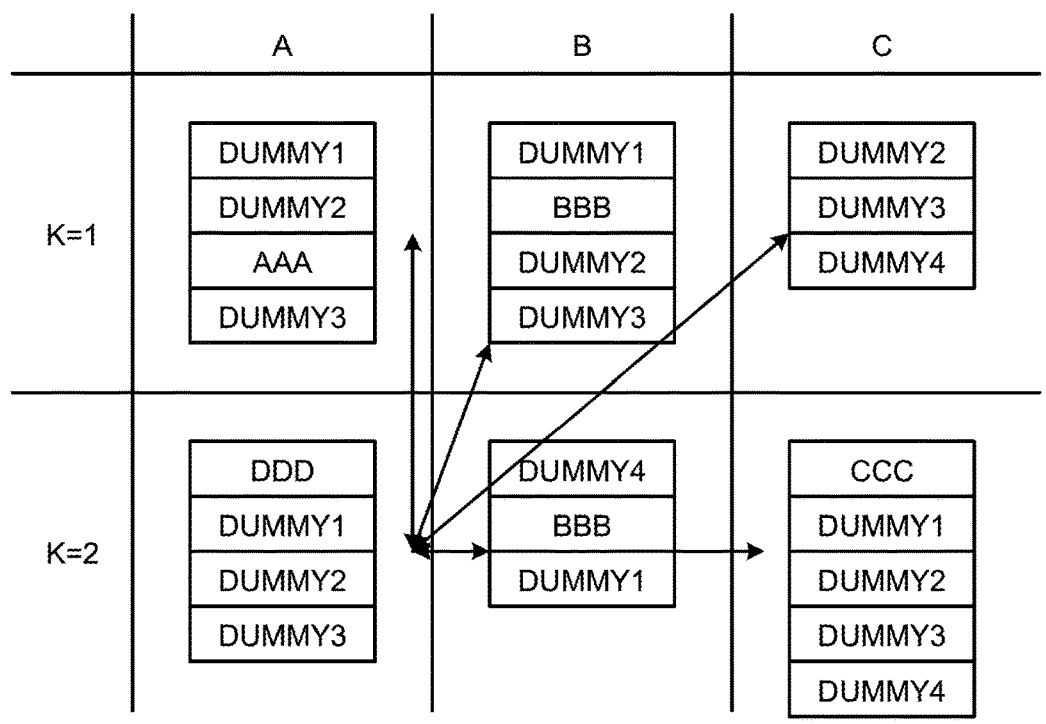
FIG. 5 is a diagram illustrating an example of an outline of detection processing according to Example 2 (Example 3).

In Example 2, in order to cope with attacks performed by an attacker using a plurality of IP addresses, calculation of the number of duplicate accounts is performed for not merely an identical source IP address but also for a plurality of other source IP addresses. FIG. 5 is a diagram illustrating an example of the outline of detection processing according to Example 2.

In Example 2, the number of duplicate accounts H[X][Y][K][Ki] of AG[X][K] and AG[Y][Ki] (K−N+1≤Ki≤K(N>0)) with respect to a certain source IP address X and Y (including a case of X=Y) included in the time slot ID_K is calculated by the following Formula (4). In Example 2, the calculation unit 13 calculates the number of duplicate accounts using H[X][Y][K][Ki] according to the following Formula (4).

$H[X][Y][K][Ki] = |AG[X][K] \cap AG[Y][Ki]|$ (4)

where K−N+1≤Ki≤K(N>0)

Moreover, in Example 2, the determination unit 14 calculates C[X] defined by the following Formula (5) in relation with a function TH(H[X][Y][K][Ki]) that results in one when H[X][Y][K][Ki]>α, and results in zero when H[X][Y][K][Ki]≤α, with respect to the predetermined positive number α. Subsequently, the determination unit 14 determines that the source IP address X that satisfies C[X]>β with respect to the predetermined positive number β is the IP address of the client 3 as the attacker by the above-described Formula (3). The determination unit 14 determines that the source IP address X that satisfies C[X]≤β with respect to the predetermined positive number β is not the IP address of the client 3 as the attacker.

$$C[X] = \sum_{K-N+1 \leq Ki \leq K, \forall Y} TH(H[X][Y][K][Ki]) \text{ where}$$ (5)

$$TH(H[X][Y][K][Ki]) = \begin{cases} 1(H[X][Y][K][Ki] > \alpha) \\ 0(H[X][Y][K][Ki] \leq \alpha) \end{cases}$$

For example, as illustrated in FIG. 5, it is assumed that the account group AG exists. FIG. 5 illustrates an exemplary case where K=2 and N=2. The calculation unit 13 calculates the number of duplicate accounts as follows. That is, each of "DDD", "DUMMY 1", "DUMMY 2", and "DUMMY 3" is a duplicate account between AG[A][2] and AG[A][2], and thus, the result is H[A][A][2][2]=4. In another case, each of "DUMMY 1", "DUMMY 2", and "DUMMY 3" is a duplicate account between AG[A][2] and AG[A][1], and thus, the result is H[A][A][2][1]=3. Similarly, "DUMMY 1" is a duplicate account between [AG][A][2] and AG[B][2], and thus, the result is H[A][B][2][2]=1 In another case, each of "DUMMY 1", "DUMMY 2", and "DUMMY 3" is a duplicate account between AG[A][2] and AG[B][1], and thus, the result is H[A][B][2][1]=3. Similarly, each of "DUMMY 1", "DUMMY 2", and "DUMMY 3" is a duplicate account between AG[A][2] and AG[C][2], and thus, the result is H[A][C][2][2]=3. In another case, each of "DUMMY 2" and "DUMMY 3" is a duplicate account between AG[A][2] and AG[C][1], and thus, the result is H[A][C][2][1]=2. Therefore, when α=2, the result is C[A]=4. Similarly, the results are C[B]=1 and C[C]=5.

Subsequently, when β=2, the result is C[A]>2 and C[C]>2, and thus, the determination unit 14 determines that the source IP addresses A and C are the IP addresses of the client 3 as the attacker by the above-described Formula (3).

Example 3

In Example 3, in addition to Example 2, in a case where Ki that satisfies TH(H[X][Y][K][Ki])=1 (K−N+1≤Ki≤K (N>0)) exists in the above-described Formula (5), the determination unit 14 determines that the source IP address Y is also the IP address of the client 3 as the attacker. That is, the determination unit 14 determines that the source IP address that satisfies C[X]>β and the source IP address Y in a case where Ki that satisfies C[X]≤β and TH(H[X][Y][K][Ki])=1 (K−N+1≤Ki≤K(N>0)) exists are the IP addresses of the client 3 as the attacker by the following Formula (6).

$C[X] > \beta \Rightarrow \text{IP address } X \text{ is the IP address of attacker}$
with respect to IP address $X$ of attacker $Ki(K-N+1 \leq Ki \leq K(N>0))$ that satisfies $TH(H[X][Y][K]$
$[Ki])=1$ exists$\Rightarrow$IP address $Y$ is the IP address of
attacker (6)

In Example 3, when α=2 and β=2, the result is C[A]>2 and C[C]>2 in FIG. 5, and thus, the determination unit 14 determines that the source IP addresses A and C are the IP addresses of the client 3 as the attacker by the above-described Formula (6). Moreover, in Example 3, TH(H[A][B][2][1])=1 is established in FIG. 5, and thus, it is determined that the source IP address B is also the IP address of the client 3 as the attacker.

According to the Examples 2 and 3 described above, it is possible to detect unauthorized logins by a plurality of source IP addresses using a dummy account, and reduce the unauthorized logins by the attacker.

Example 4

Figure 6:
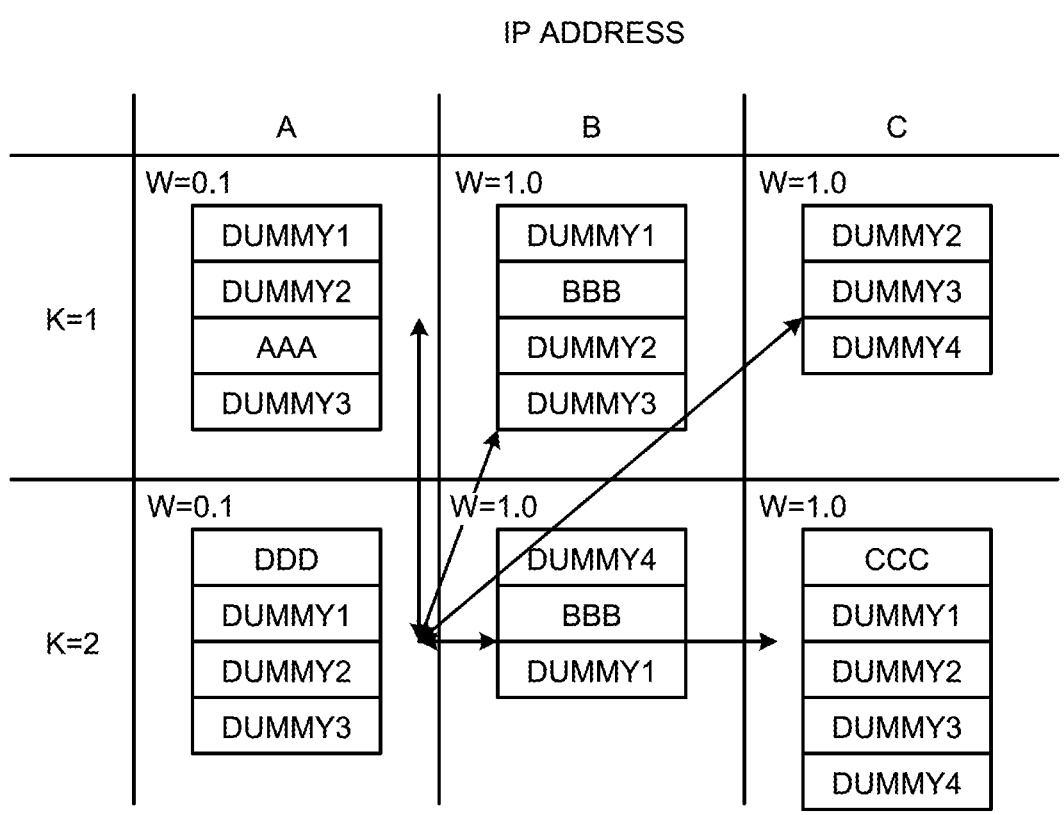
FIG. 6 is a diagram illustrating an example of an outline of detection processing according to Example 4 (Example 5).

In Example 4, in calculation of the number of duplicate accounts, the determination unit 14 performs weighting for each of the account groups in consideration of the difference of the case between the source IP addresses and the case between the time slots, and calculates the number of duplicate accounts with this weighting. FIG. 6 is a diagram illustrating an example of the outline of detection processing according to Example 4.

In Example 4, as illustrated in the following Formula (7), C[X] is calculated by multiplying TH(H[X][Y][K][Ki]) (K−N+1≤Ki≤N(N>0)) by a weighting coefficient W[Y][Ki] (K−N+1≤Ki≤N) for each of the account groups AG[Y][Ki] (K−N+1≤Ki≤N(N>0)).

$$C[X] = \sum_{K-N+1 \le Ki \le K, \forall Y} W[Y][Ki] * TH(H[X][Y][K][Ki]) \text{ where} \quad (7)$$

$$TH(H[X][Y][K][Ki]) = \begin{cases} 1 (H[X][Y][K][Ki] > \alpha) \\ 0 (H[X][Y][K][Ki] \le \alpha) \end{cases}$$

For example, as illustrated in FIG. 6, it is assumed that the account group AG exists. It is also assumed that the initial values of the weighting coefficients W[Y][Ki] corresponding to AG[Y][Ki] (K−N+1≤Ki≤K−1) are all 1.0. For example, in the case of placing greater emphasis on the duplication between the source IP addresses (hereinafter referred to as a rule 1), the value of W[Y][Ki] is determined as a relatively small value when X=Y, and determined as a relatively great value when X≠Y. This further emphasizes the duplication for a case where the source IP addresses are mutually different. Moreover, for example, in the case of placing greater emphasis on the duplication in accordance with the proximity of the time points between the time slots (hereinafter referred to as a rule 2), the weighting coefficient W[Y][Ki] of the source IP address Y with respect to the source IP address X is set so as to satisfy W[Y][K−1]>W[Y][K−2]> . . . >W[Y][K−N+1]. This further emphasizes the account duplication at the time points in a close proximity to each other. Note that the weighting method is not limited to the rule 1 or the rule 2, but may be a combination of rule 1 and rule 2, for example.

In Example illustrated in FIG. 6, setting is performed to establish W[A][1]=W[A][2]=0.1, W[B][1]=W[B][2]=W[C][1]=W[C][2]=1.0 on the basis of the rule 1. In this, each of "DDD", "DUMMY 1", "DUMMY 2", and "DUMMY 3" is a duplicate account between AG[A][2] and AG[A][2], and thus, the result is H[A][A][2][2]=4. In another case, each of "DUMMY 1", "DUMMY 2", and "DUMMY 3" is a duplicate account between AG[A][2] and AG[A][1], and thus, the result is H[A][A][2][1]=3. Similarly, "DUMMY 1" is a duplicate account between AG[A][2] and AG[B][2], and thus, the result is H[A][B][2][2]=1 In another case, each of "DUMMY 1", "DUMMY 2", and "DUMMY 3" is a duplicate account between AG[A][2] and AG[B][1], and thus, the result is H[A][B][2][1]=3. Similarly, each of "DUMMY 1", "DUMMY 2", and "DUMMY 3" is a duplicate account between AG[A][2] and AG[C][2], and thus, the result is H[A][C][2][2]=3. In another case, each of "DUMMY 2" and "DUMMY 3" is a duplicate account between AG[A][2] and AG[C][1], and thus, the result is H[A][C][2][1]=2. Therefore, when α=2, C[A]=0.1×TH(H[A][A][2][2])+0.1×TH(H[A][A][2][1])+1.0×TH(H[A][B][2][2])+1.0×TH(H[A][A][2][1])+1.0×TH(H[A][C][2][2])+1.0×TH(H[A][C][2][1])=0.1×1+0.1×1+1.0×0+1.0×1+1.0×1+1.0×0=2.2.

Subsequently, when β=2, the result is C[A]>2, and thus, the determination unit 14 determines that the source IP address A is the IP address of the client 3 as the attacker by the above-described Formula (3).

Similarly, the setting is performed to establish W[C][1]=W[C][2]=0.1, W[B][1]=W[B][2]=W[A][1]=W[A][2]=1.0. Since each of "CCC", "DUMMY 1", "DUMMY 2", "DUMMY 3", and "DUMMY 4" is a duplicate account between AG[C][2] and AG[C][2], the result is H[C][C][2][2]=4. Moreover, each of "DUMMY 2", "DUMMY 3" and "DUMMY 4" is a duplicate account between AG[C][2] and AG[C][1], and thus, the result is H[C][C][2][1]=3. Similarly, each of "DUMMY 1" and "DUMMY 4" is a duplicate account between AG[C][2] and AG[B][2], and thus, the result is H[C][B][2][2]=2. Moreover, each of "DUMMY 1", "DUMMY 2", and "DUMMY 3" is a duplicate account between AG[C][2] and AG[B][1], and thus, the result is H[C][B][2][1]=3. Similarly, each of "DUMMY 1", "DUMMY 2", and "DUMMY 3" is a duplicate account between AG[C][2] and AG[A][2], and thus, the result is H[C][A][2][2]=3. Moreover, each of "DUMMY 1", "DUMMY 2", and "DUMMY 3" is a duplicate account between AG[C][2] and AG[A][1], and thus, the result is H[C][A][2][1]=3. Therefore, when α=2, C[C]=0.1×TH(H[C][C][2][2])+0.1×TH(H[C][C][2][1])+1.0×TH(H[C][B][2][2])+1.0×TH(H[C][B][2][1])+1.0×TH(H[C][A][2][2])+1.0×TH(H[C][A][2][1])=0.1×1+0.1×1+1.0×0+1.0×1+1.0×1+1.0×1=3.2

Subsequently, when β=2, the result is C[C]>2, and thus, the determination unit 14 determines that the source IP address C is the IP address of the client 3 as the attacker by the above-described Formula (3).

Example 5

Example 5 is a combination of Example 3 and Example 4. That is, in Example 5, in addition to the case of determination in Example 4, the determination unit 14 determines that the source IP address Y is also the IP address of the client 3 as the attacker in a case where Ki that satisfies TH(H[X][Y][K][Ki])=1 (K−N+1≤Ki≤K(N>0)) exists in the above-described Formula (7). That is, the determination unit 14 determines that the source IP address X that satisfies C[X]>β and the source IP address Y in a case where Ki that satisfies C[X]≤β and TH(H[X][Y][K][Ki])=1 (K−N+1Ki≤K(N>0)) exists are the IP addresses of the client 3 as the attacker by the above-described Formula (6).

In Example 5, when α=2 and β=2, the result is C[A]>2 and C[C]>2 in FIG. 6, and thus, it is determined that the source IP addresses A and C are the IP addresses of the client 3 as the attacker by the above-described Formula (6). Moreover, in Example 5, TH(H[C][B][2][1])=1 is established in FIG. 6, and thus, it is determined that the source IP address B is also the IP address of the client 3 as the attacker.

According to the Examples 4 and 5 described above, it is possible to detect with higher accuracy unauthorized logins by a plurality of source IP addresses using a dummy account, and reduce the unauthorized logins by the attacker.

In Examples 1 to 5 described above, the calculation unit 13 calculates the number of duplicate accounts among each of the same account groups in calculating the number of duplicate accounts between the account groups. However, when calculating the number of duplicate accounts among the account groups, the calculation unit 13 may be configured to exclude the number of duplicate accounts among each of the same account groups and calculate the number of duplicate accounts between different account groups alone. In this case, the above-described predetermined positive numbers α and β are also adjusted to be appropriate values.

As illustrated in the above Examples 1 to 5, the embodiment disclosed in the present application is a case of performing attack determination by detecting the dummy account used by the attacker without depending on the authentication failure rate nor the authentication success rate. Accordingly, with the embodiment, it is possible to detect an attack of performing a large number of unauthorized logins by arbitrarily manipulating the authentication failure rate and the authentication success rate from the source IP address used by the attacker oneself, leading to the reduction of the unauthorized logins by the attacker.

Configuration of Detection Apparatus

Each of components of the detection apparatus 10 illustrated in FIG. 1 is functional and conceptual and the components need not be physically configured as illustrated. That is, specific modes of dispersion and integration of the functions of the detection apparatus 10 are not limited to those illustrated in the drawings, and all or a portion of the detection apparatus 10 may be functionally or physically provided in arbitrary units according to various loads, usage conditions, being functionally or physically dispersed, or integrated.

All or a portion of the processing performed in the detection apparatus 10 may be implemented by a processing apparatus such as a central processing unit (CPU) and by a program analyzed and executed by the processing apparatus. Moreover, each of the processing performed on the detection apparatus 10 may be implemented in hardware by wired logic.

Moreover, it is possible to perform manually all or a portion of the processing described as processing performed automatically among all the processing described in the embodiments and Examples. Alternatively, it is possible to perform automatically with a known method all or a portion of the processing described as processing performed manually among all the processing described in the embodiments and Examples. Besides this, information including the processing procedure, the control procedure, the specific name, various data and parameters as described above or illustrated in the drawings can be appropriately changed unless otherwise noted.

About the Program

Figure 7:
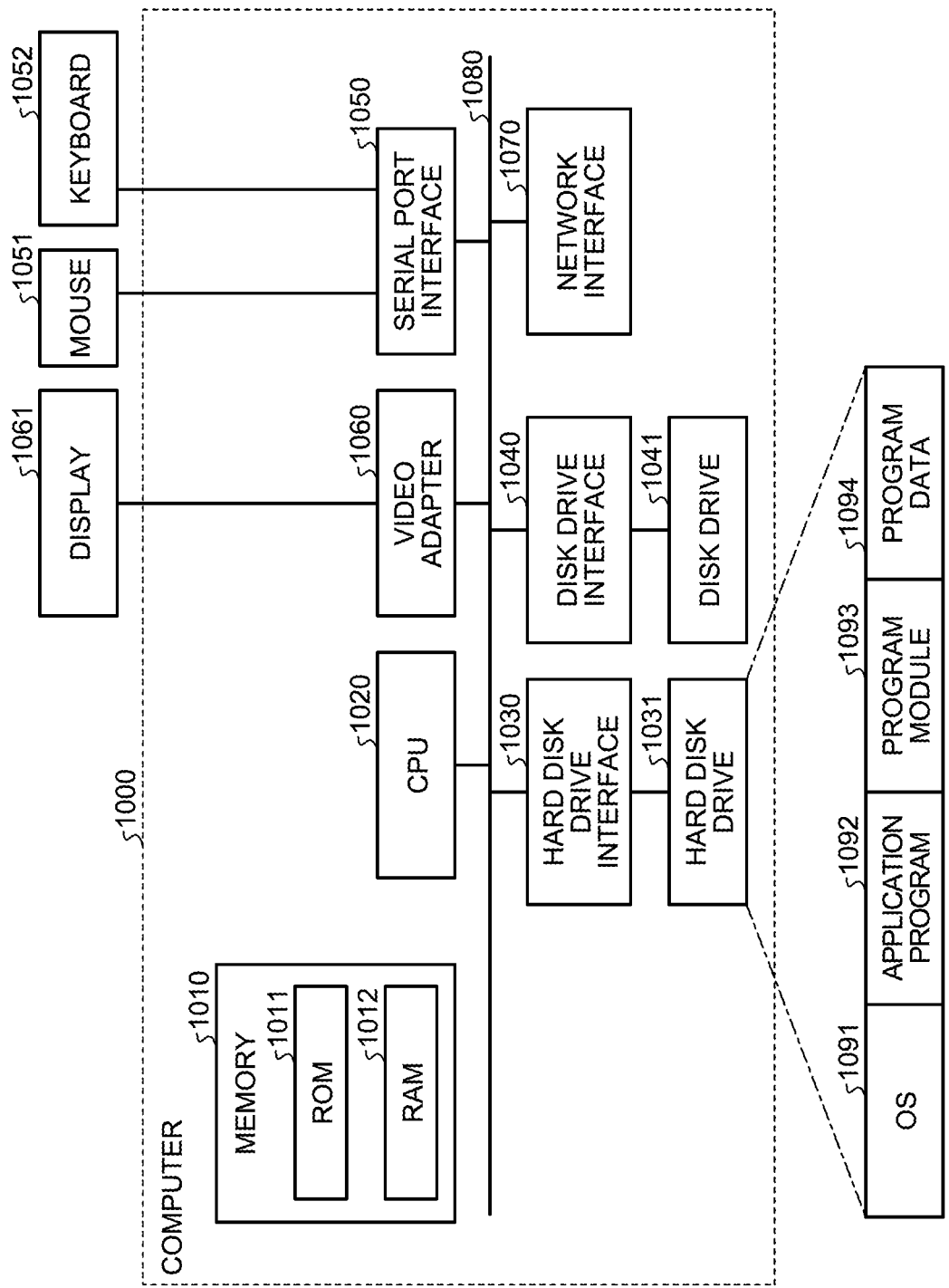
FIG. 7 is a diagram illustrating an exemplary computer configured to implement a detection apparatus by execution of a program.

FIG. 7 is a diagram illustrating an exemplary computer configured to implement a detection apparatus by execution of a program. A computer 1000 includes a memory 1010 and a CPU 1020, for example. The computer 1000 also includes a hard disk drive interface 1030, a disk drive interface 1040, a serial port interface 1050, a video adapter 1060, and a network interface 1070. In the computer 1000, these units are connected via a bus 1080.

The memory 1010 includes a read only memory (ROM) 1011 and a RAM 1012. The ROM 1011 stores, for example, a boot program such as basic input output system (BIOS). The hard disk drive interface 1030 is connected to a hard disk drive 1031. The disk drive interface 1040 is connected to a disk drive 1041. For example, a detachable storage medium such as a magnetic disk and an optical disk is inserted into the disk drive 1041. The serial port interface 1050 is connected to a mouse 1051 and a keyboard 1052, for example. The video adapter 1060 is connected to a display 1061, for example.

The hard disk drive 1031 stores, for example, an OS 1091, an application program 1092, a program module 1093, and program data 1094. That is, the program that defines each processing of the detection apparatus 10 is stored in the hard disk drive 1031, for example, as the program module 1093 describing an instruction to be executed by the computer 1000. For example, the program module 1093 for executing information processing similar to the functional configuration of the detection apparatus 10 is stored in the hard disk drive 1031.

Setting data used in the processing in the above-described embodiment is stored as the program data 1094 in the memory 1010 or in the hard disk drive 1031, for example. The CPU 1020 reads the program module 1093 and the program data 1094 stored in the memory 1010 and the hard disk drive 1031 onto the RAM 1012 and executes them as necessary.

The program module 1093 and the program data 1094 are not merely stored in the hard disk drive 1031, but may be stored in a removable storage medium, for example, and may be read by the CPU 1020 via the disk drive 1041, or the like. Alternatively, the program module 1093 and the program data 1094 may be stored in another computer connected via a network (such as a local area network (LAN), a wide area network (WAN)). The program module 1093 and the program data 1094 may be read by the CPU 1020 via the network interface 1070.

The above-described embodiment and modifications of the embodiment are included in the scope of the invention described in the claims and the equivalent as well as included in the technique disclosed by the present application.

REFERENCE SIGNS LIST

1 SYSTEM
2 NETWORK
3 CLIENT
4 SERVER
10 DETECTION APPARATUS
11 ACCOUNT GROUP STORAGE UNIT
12 EXTRACTION UNIT
13 CALCULATION UNIT
14 DETERMINATION UNIT
1000 COMPUTER
1010 MEMORY
1020 CPU

The invention claimed is:
1. A detection system comprising:
an authentication apparatus including circuitry configured to perform user authentication; and
a detection apparatus including circuitry configured to:
extract an account and a source address of the account from authentication information obtained from the authentication apparatus, group accounts for each of a plurality of time slots at predetermined time intervals and each of a plurality of source addresses in accordance with a timestamp and the source address of the account, and extract an account group from which duplication of an identical account in an identical group has been excluded;
calculate a number of duplicate accounts among account groups extracted; and
determine that an identical source address is an address of an attacker in a case where a number of account groups of the identical source address, in which the number of accounts calculated exceeds a first threshold, exceeds a second threshold,
wherein, in determining that the identical source address is an address of an attacker, the circuitry performs detection of an attack based on a number of duplicate accounts used in login attempts from each of the plurality of source addresses during a fixed period, and the circuitry determines an account group number representing a number of account groups in which the number of duplicate accounts exceed a first threshold, and determines whether the account group number exceeds a second threshold in order to identify the identical source address as belonging to the attacker.

2. A detection apparatus comprising:
circuitry including at least a processor and a memory, the circuitry being configured to:
extract an account and a source address of the account from authentication information obtained from an authentication apparatus, group accounts for each of a plurality of time slots at predetermined time intervals and each of a plurality of source addresses in accordance with a timestamp and the source address of the account, and extract an account group from which duplication of an identical account in an identical group has been excluded;
calculate a number of duplicate accounts among extracted account groups; and
determine that an identical source address is an address of an attacker in a case where a number of account groups of the identical source address, in which a number of accounts calculated exceeds a first threshold exceeds, a second threshold,
wherein, in determining that the identical source address is an address of an attacker, the circuitry performs detection of an attack based on a number of duplicate accounts used in login attempts from each of the plurality of source addresses during a fixed period, and
the circuitry determines an account group number representing a number of account groups in which the number of duplicate accounts exceed a first threshold, and determines whether the account group number exceeds a second threshold in order to identify the identical source address as belonging to the attacker.

3. The detection apparatus according to claim 2, wherein the circuitry is further configured to
calculate a first number of accounts duplicating between an account group corresponding to a latest time slot among account groups having a first source address and an account group corresponding to a predetermined number of time slots before the latest time slot among the account groups having the first source address, and
determine that the first source address is an address of the attacker in a case where the number of account groups, in which the first number of accounts exceeds the first threshold, exceeds the second threshold.

4. The detection apparatus according to claim 3, wherein the circuitry is further configured to:
calculate a second number of accounts duplicating between an account group corresponding to a latest time slot among the account groups having a first source address and an account group corresponding to a predetermined number of time slots before the latest time slot among the account groups having a source address other than the first source address, and
determine that the first source address is an address of the attacker in a case where the number of account groups, in which the second number of accounts exceeds the first threshold, exceeds the second threshold.

5. The detection apparatus according to claim 4, wherein in a case where there is an account group in which the second number of accounts exceeds the first threshold, the circuitry is configured to determine that the source address other than the first source address, corresponding to the account group in which the second number of accounts exceeds the first threshold, is the address of the attacker.

6. The detection apparatus according to claim 2, wherein the circuitry is further configured to determine the address of the attacker on the basis of a value obtained by multiplying the number of accounts calculated by each of weighting coefficients corresponding to the time slot or the source address.

7. A detection method applied in a detection system including an authentication apparatus configured to perform user authentication and including a detection apparatus, the detection method executed by the detection apparatus, the detection method comprising:
extracting, with circuitry, an account and a source address of the account from authentication information obtained from the authentication apparatus;
grouping, with the circuitry, accounts for each of a plurality of time slots at predetermined time intervals and each of a plurality of source addresses in accordance with a timestamp and the source address of the account;
extracting, with the circuitry, an account group from which duplication of an identical account in an identical group has been excluded;
calculating, with the circuitry, a number of duplicate accounts among extracted account groups; and
determining, with the circuitry, that an identical source address is an address of an attacker in a case where a number of account groups of the identical source address, in which the number of calculated accounts exceeds a first threshold, exceeds a second threshold,
wherein the determining that the identical source address is an address of an attacker includes performing detection of an attack based on a number of duplicate accounts used in login attempts from each of the plurality of source addresses during a fixed period, and
the determining that the identical source address is an address of an attacker includes determining an account group number representing a number of account groups in which the number of duplicate accounts exceed a first threshold, and determining whether the account group number exceeds a second threshold in order to identify the identical source address as belonging to the attacker.

8. A non-transitory computer-readable recording medium having stored a detection program that causes a computer to execute a process comprising:
extracting an account and a source address of the account from authentication information obtained from an authentication apparatus;
grouping accounts for each of time slots at predetermined time intervals and each of source addresses in accordance with a timestamp and the source address of the account;
extracting an account group from which duplication of an identical account in an identical group has been excluded;
calculating the number of duplicate accounts among extracted account groups; and determining that an identical source address is an address of an attacker in a case where the number of account groups of the identical source address, in which the number of calculated accounts exceeds a first threshold, exceeds a second threshold,
wherein the determining that the identical source address is an address of an attacker includes performing detection of an attack based on a number of duplicate accounts used in login attempts from each of the plurality of source addresses during a fixed period, and the determining that the identical source address is an address of an attacker includes determining an account group number representing a number of account groups in which the number of duplicate accounts exceed a first threshold, and determining whether the account group number exceeds a second threshold in order to identify the identical source address as belonging to the attacker.

* * * * *